United States Patent
Schütz

(10) Patent No.: US 7,685,906 B2
(45) Date of Patent: *Mar. 30, 2010

(54) VEHICLE STEERING WHEEL

(75) Inventor: Dominik Schütz, Waldaschaff (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/418,892

(22) Filed: May 5, 2006

(65) Prior Publication Data

US 2006/0213316 A1    Sep. 28, 2006

Related U.S. Application Data

(62) Division of application No. 10/264,245, filed on Oct. 3, 2002, now Pat. No. 7,134,360.

(30) Foreign Application Priority Data

Oct. 5, 2001    (DE)    ................. 201 16 306

(51) Int. Cl.
    B62D 1/04    (2006.01)
    H01H 9/00   (2006.01)
    B60R 21/16  (2006.01)
(52) U.S. Cl. ............ 74/552; 200/61.54; 280/731; 280/728.2
(58) Field of Classification Search ........... 74/552, 74/484 R, 492; 280/731, 730.1, 728.2; 200/61.54, 200/61.55; 318/489
See application file for complete search history.

(56) References Cited

U.S. PATENT DOCUMENTS

| | | | |
|---|---|---|---|
| 3,795,414 A * | 3/1974 | Ventre et al. | ............. 280/730.1 |
| 4,699,400 A * | 10/1987 | Adams et al. | ............... 280/731 |
| 4,729,254 A | 3/1988 | Nogami et al. | |
| 5,023,412 A * | 6/1991 | Ishida | ..................... 200/61.54 |
| 5,508,482 A | 4/1996 | Martin et al. | |
| 5,569,893 A | 10/1996 | Seymour | |
| 5,756,950 A | 5/1998 | De Filippo | |
| 6,153,996 A | 11/2000 | Nigrin et al. | |
| 6,183,005 B1 | 2/2001 | Nishijima et al. | |
| 6,299,201 B1 | 10/2001 | Fujita | |

(Continued)

FOREIGN PATENT DOCUMENTS

DE    44 38 195 C1 *    11/1995

(Continued)

OTHER PUBLICATIONS

Webster's II New Riverside University Dictionary, 1994, pp. 904 and 905.*

(Continued)

*Primary Examiner*—Vinh T. Luong
(74) *Attorney, Agent, or Firm*—Tarolli, Sundheim, Covell & Tummino LLP

(57) ABSTRACT

A vehicle steering wheel (10) includes a hub (12) and an airbag module (26). The vehicle steering wheel (10) further includes a plurality of switches (18, 20, 22) being integrated in a common housing (16). The housing (16) is fitted on the airbag module (26) and includes at least one mount (32) cooperating with a cover (28) of the airbag module (26).

4 Claims, 3 Drawing Sheets

U.S. PATENT DOCUMENTS

| | | | |
|---|---|---|---|
| 6,312,012 B1 * | 11/2001 | Bohn et al. | 280/731 |
| 6,349,616 B1 | 2/2002 | Onodera et al. | |
| 6,426,473 B1 | 7/2002 | Derrick et al. | |
| 6,437,265 B1 | 8/2002 | Kreuzer | |
| 6,453,769 B2 | 9/2002 | Sakurai | |
| 6,545,236 B2 | 4/2003 | Valk et al. | |
| 6,639,160 B2 | 10/2003 | Ibe et al. | |
| 6,849,816 B2 | 2/2005 | Rumpf | |
| 6,852,936 B2 | 2/2005 | Hayashi et al. | |
| 7,077,427 B2 * | 7/2006 | Rhea | 280/731 |
| 7,264,266 B2 * | 9/2007 | Erlingstam et al. | 280/728.2 |
| 2001/0052694 A1 | 12/2001 | Schutz | |
| 2002/0125698 A1 | 9/2002 | Schutz | |
| 2009/0255366 A1 * | 10/2009 | Choi et al. | 74/552 |

FOREIGN PATENT DOCUMENTS

| | | |
|---|---|---|
| DE | 19914653 | 7/2000 |
| DE | 19956872 | 6/2001 |
| DE | 20103890 | 8/2001 |
| EP | 0 560 355 A1 * | 9/1993 |
| EP | 1 072 475 A1 * | 1/2001 |
| EP | 1088737 | 4/2001 |

OTHER PUBLICATIONS

Webster's II New Riverside University Dictionary, 1994, p. 321.*

* cited by examiner

VEHICLE STEERING WHEEL

This application is a divisional of application Ser. No. 10/264,245 filed on Oct. 3, 2002, now U.S. Pat. No. 7,134,360.

TECHNICAL FIELD

The invention relates to a vehicle steering wheel.

BACKGROUND OF THE INVENTION

A steering wheel normally includes a hub and several switches. The switches enable the vehicle driver to operate e.g. the gear change, the radio or a telephone without having to take the hands off the steering wheel. Hitherto, a separate switch was provided fitted to the hub for each function to be switched. This complicates assembly. Apart from this a complicated system is needed to ensure precise location of the switches since otherwise an undesirable gap between adjacent components, for example a neighboring switch or a cover of the steering wheel, may materialize.

The object of the invention is to further develop a steering wheel of the aforementioned kind so that assembly and production complications are reduced.

BRIEF SUMMARY OF THE INVENTION

According to the invention, a vehicle steering wheel comprises a hub and an airbag module. The vehicle steering wheel further comprises a plurality of switches being integrated in a common housing. The housing is fitted on the airbag module and comprises at least one mount cooperating with a cover of the air bag module. This results in only a single housing needing to be produced for the plurality of switches. The single housing is attached to the airbag module, and then this pre-mounted unit is installed in the steering wheel, thus reducing the number of components and assembly steps. Apart from this, the various switches are now precisely positioned relative to each other so that no undesirable gap can materialize between the individual switches. Moreover, the construction according to the invention results in particularly precise positioning of the cover for the air bag module relative to the switches so that no undesirable gap can materialize between the individual switches and the cover.

According to a further aspect of the invention, an apparatus comprises a rotatable vehicle steering wheel having a hub member connected to a steering column and rotatable with the steering wheel; an air bag module including a cover mounted on the steering wheel; and a housing supporting a plurality of electrical switches, the housing being spaced apart from the cover, the housing being secured to, mounted on, and supported by the air bag module. In the preferred embodiment of the invention the housing comprises at least one mount cooperating with the cover.

Preferably the mount is formed by a mounting peg engaging an opening of the cover. This results in the cover being movable relative to the switches which are fixedly secured to the steering wheel, so that they can be pressed, for example, to actuate a signal horn switch.

It is preferably provided for that the housing surrounds the air bag module at least in part. This enables the switches to be arranged to advantage in the portions surrounding the air bag module available between the rim of the steering wheel and the air bag module so that a particularly compact design materializes.

Preferably a plug is provided, all of the switches being connected to the plug. This plug can be fitted at a suitable location either directly on the housing or at the end of a cable ported into the housing. All switches can now be connected with minimum complication simply by inserting this sole plug into a complementary connector socket.

Preferably the function of at least one of the switches is adapted to be programmed, thus enabling a standardized housing to be used with the various switches for different variants of the vehicle or vehicle fittings.

In accordance with the preferred embodiment of the invention it is provided for that one of the switches serves to activate a hazard warning flasher. This switch is provided in a central position for optimum accessibility so that the hazard warning flasher can be activated, if required, without delay and without having to take the hands off the steering wheel. In addition, it may be provided for that the hazard warning flasher is activated automatically and electromechanically on activation of the air bag module or by the activation electronics of the air bag module.

Advantageous aspects of the invention will be apparent from the sub-claims.

DETAILED DESCRIPTION OF THE INVENTION

Figure 1:
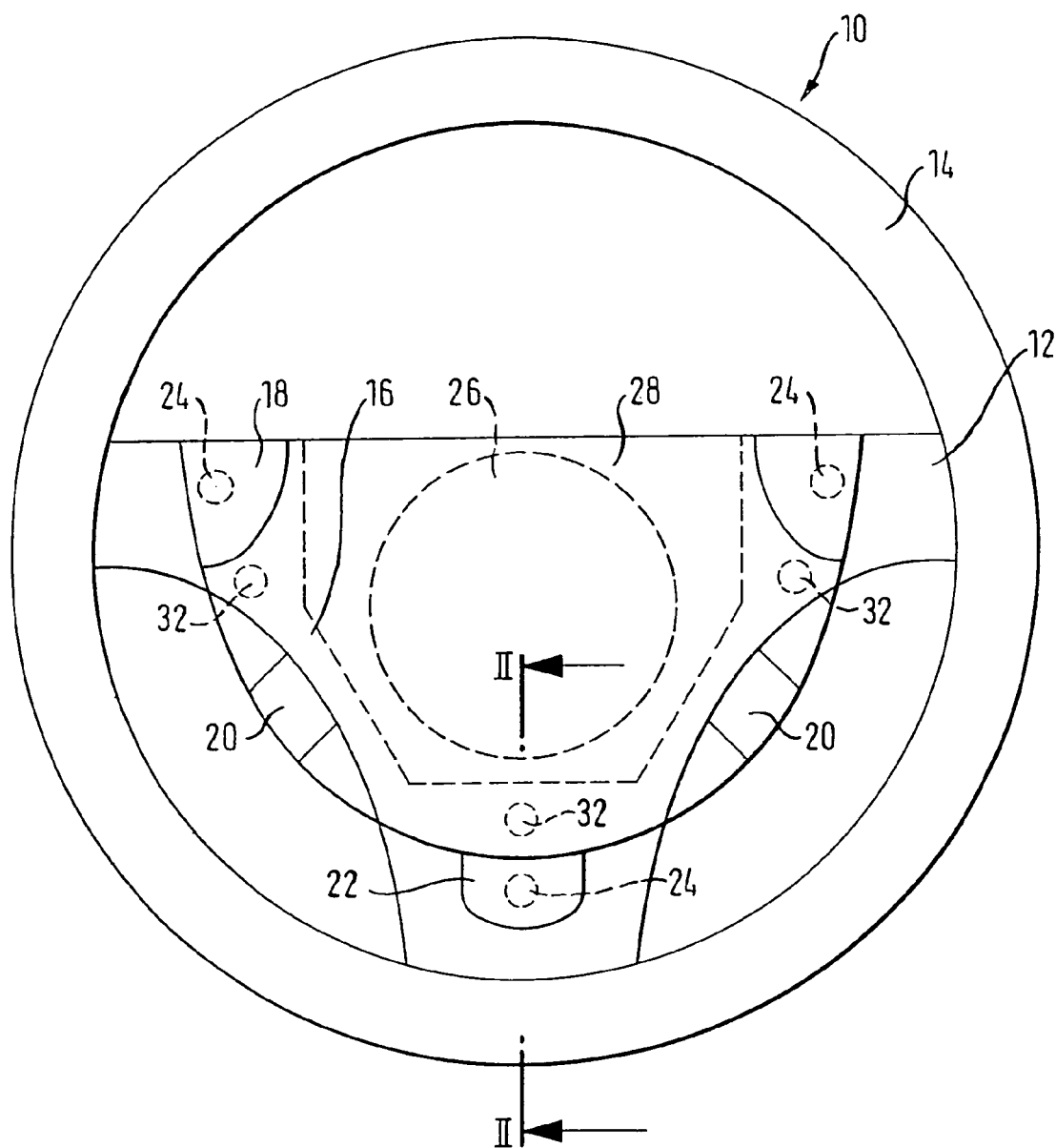
FIG. 1 is a diagrammatic plan view of a steering wheel.
Figure 2:
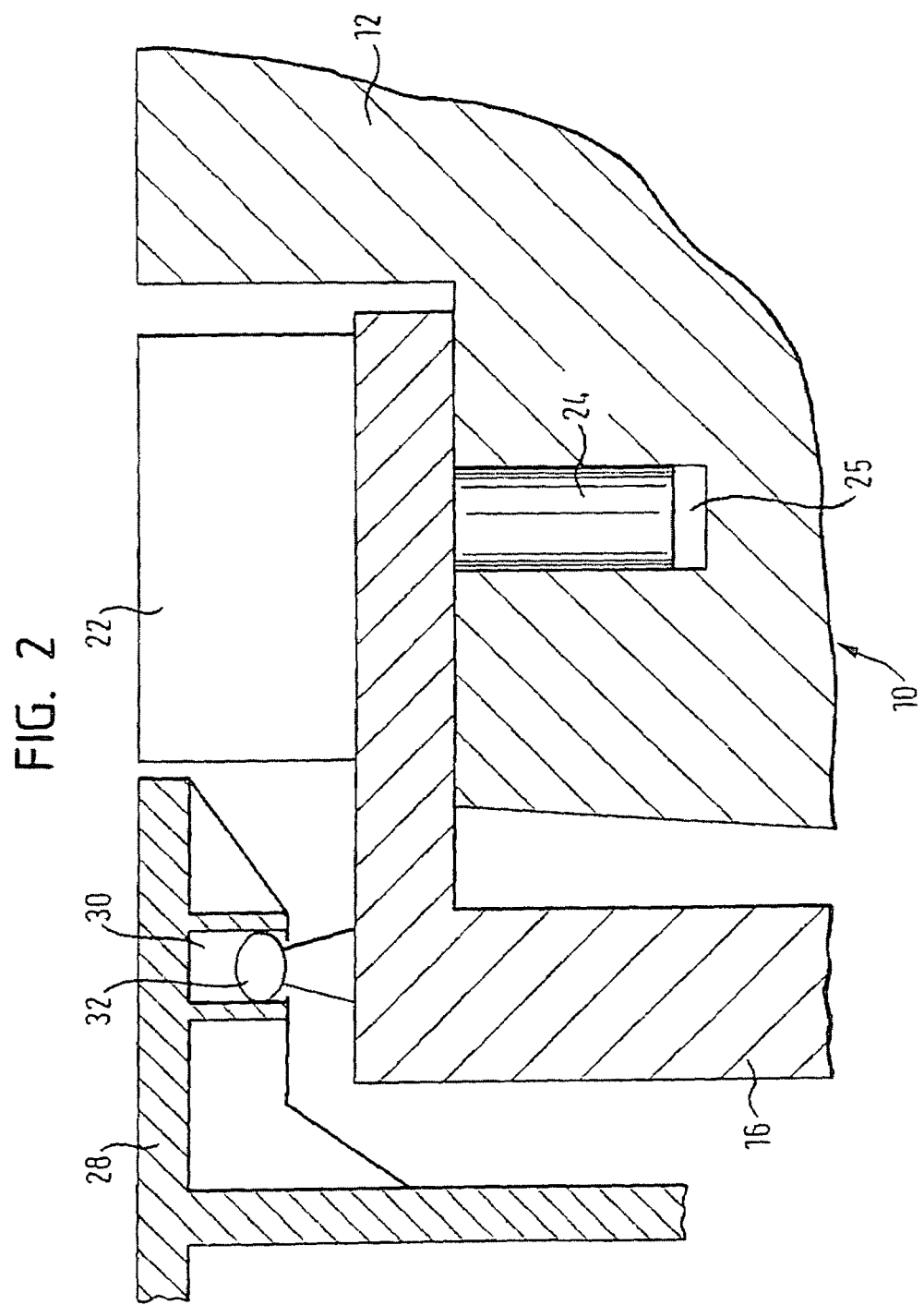
FIG. 2 is a diagrammatic sectional view taken along the plane II-II as shown in FIG. 1.
Figure 3:
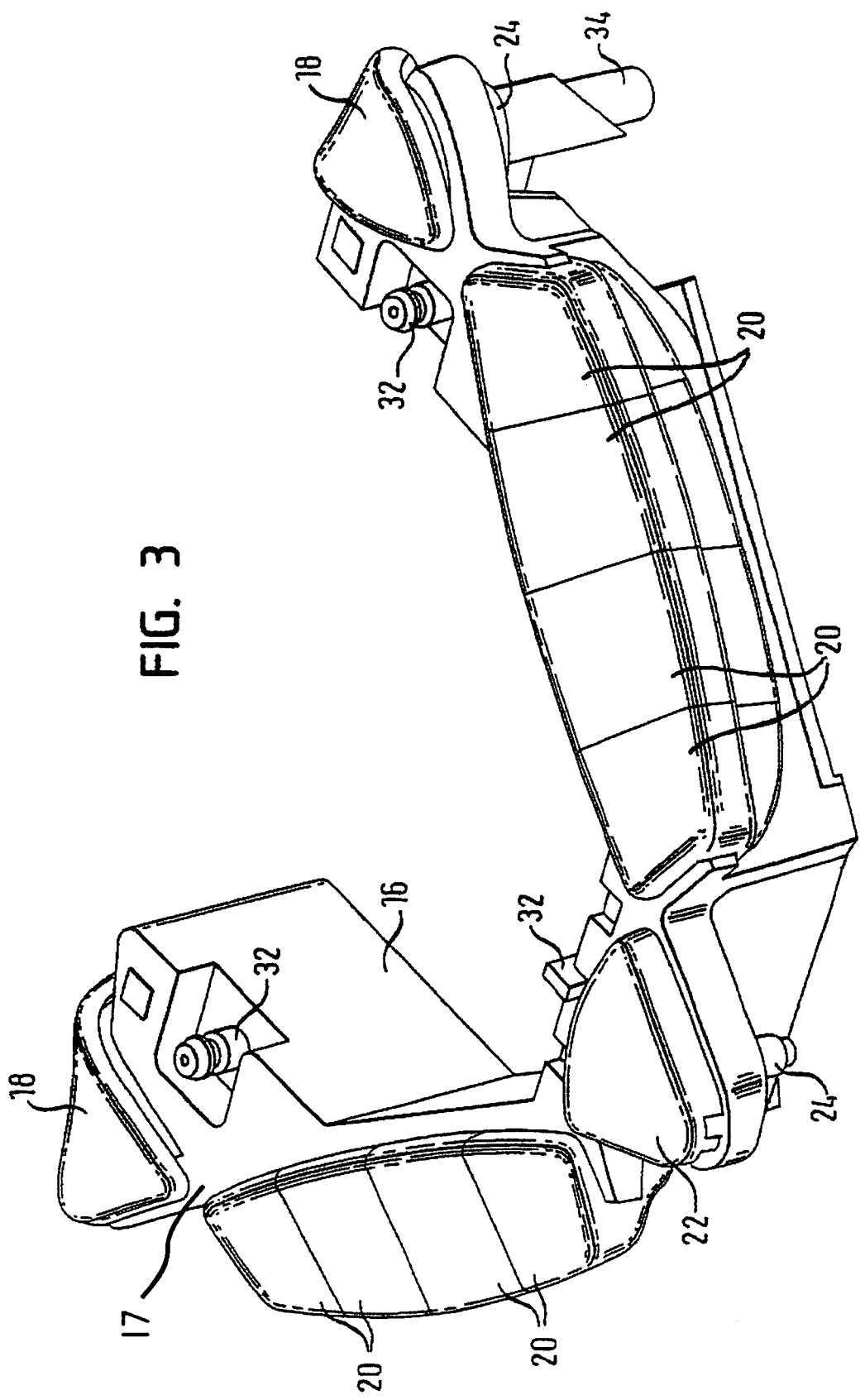
FIG. 3 is a view in perspective of a housing including switches as used on the steering wheel as shown in FIG. 1.

Referring now to FIG. 1 there is illustrated a vehicle steering wheel 10 comprising a hub 12 and a rim 14. Attached to the hub 12 is a housing 16 (see also FIGS. 2 and 3) in which several switches 18, 20, 22 are accommodated. Each of the switches 18, 20, 22 engages an upper surface 17 of the housing 16. The housing 16 is provided, for the purpose of being fitted to or positioned on the hub 12, with several locating pegs 24 engaging corresponding holes 25 in the hub.

The housing 16 is configured U-shaped (see FIG. 3) in general, i.e. it surrounding a center space by approximately 180°. Mounted in this center space is an air bag module 26 indicated diagrammatically. On the side of the air bag module 26 facing the vehicle driver, a cover 28 is mounted forming a more or less flush finish with the switches 18, 20, 22, to ensure enhanced visual appeal as a whole.

For fitting or positioning the cover 28 it is provided with several openings 30, each of which is engaged by a mounting peg 32 fitted to the housing 16. The mounting peg 32 together with the openings 30 enable the cover 28 to be depressed in a direction parallel to the axis of rotation of the steering wheel for actuating the signal horn, for example.

In this configuration, the housing 16 together with the locating pegs 24 which cooperate with the hub 12, and with the mounting pegs 32 which cooperate with the cover, simultaneously serves to locate and guide the cover 28 relative to the partly adjoining hub 12.

Since the cover 28 is directly fitted to the housing 16 of the switches, the gaps between the cover and the switches are minimized, despite the cover being shiftable. Similar minimized gaps result between the switches and the hub of the steering wheel, since the housing of the switches is securely fitted to or positioned on the hub.

Circuit boards and other connecting elements for the various switches 18, 20, 22 may be arranged in the housing 16, including also electronics components, so that the function of the switches can be freely programmed. For this purpose a programming terminal 34 is provided which is accessible from the rear in the fitted steering wheel. In this way it is possible to provide for an individual, customized switch circuiting for one and the same vehicle type. Only a sole plug is provided for connecting all switches by it being simply inserted in a complementary connector socket on assembly of the vehicle steering wheel.

In accordance with another embodiment of the invention (not shown) it may be provided for that several switches are mounted on the air bag module 26 instead of on the hub 12. The advantages afforded by this arrangement are essentially the same as those as already described for the arrangement in being fitted to the hub.

The invention claimed is:

1. An apparatus comprising:
   a rotatable vehicle steering wheel having a hub member rotatable with the steering wheel;
   an air bag module including a cover mounted on said steering wheel, said cover being a separate piece from said hub;
   a housing supporting a plurality of electrical switches, said housing being totally spaced apart from said cover, said housing being secured to, mounted on, and supported by said hub member; and
   members extending from said housing into openings in said hub member spaced apart from the cover to locate said housing relative to said hub member.

2. The apparatus of claim 1, wherein said cover is positioned flush with said electrical switches when said electrical switches are not actuated.

3. The apparatus of claim 1 wherein said cover is positioned flush with said hub member.

4. The apparatus of claim 1, wherein said members engage said openings in said hub.

* * * * *